July 25, 1944.         H. SPITZER         2,354,486
ROTARY ENGINE
Filed Jan. 6, 1942         3 Sheets-Sheet 1
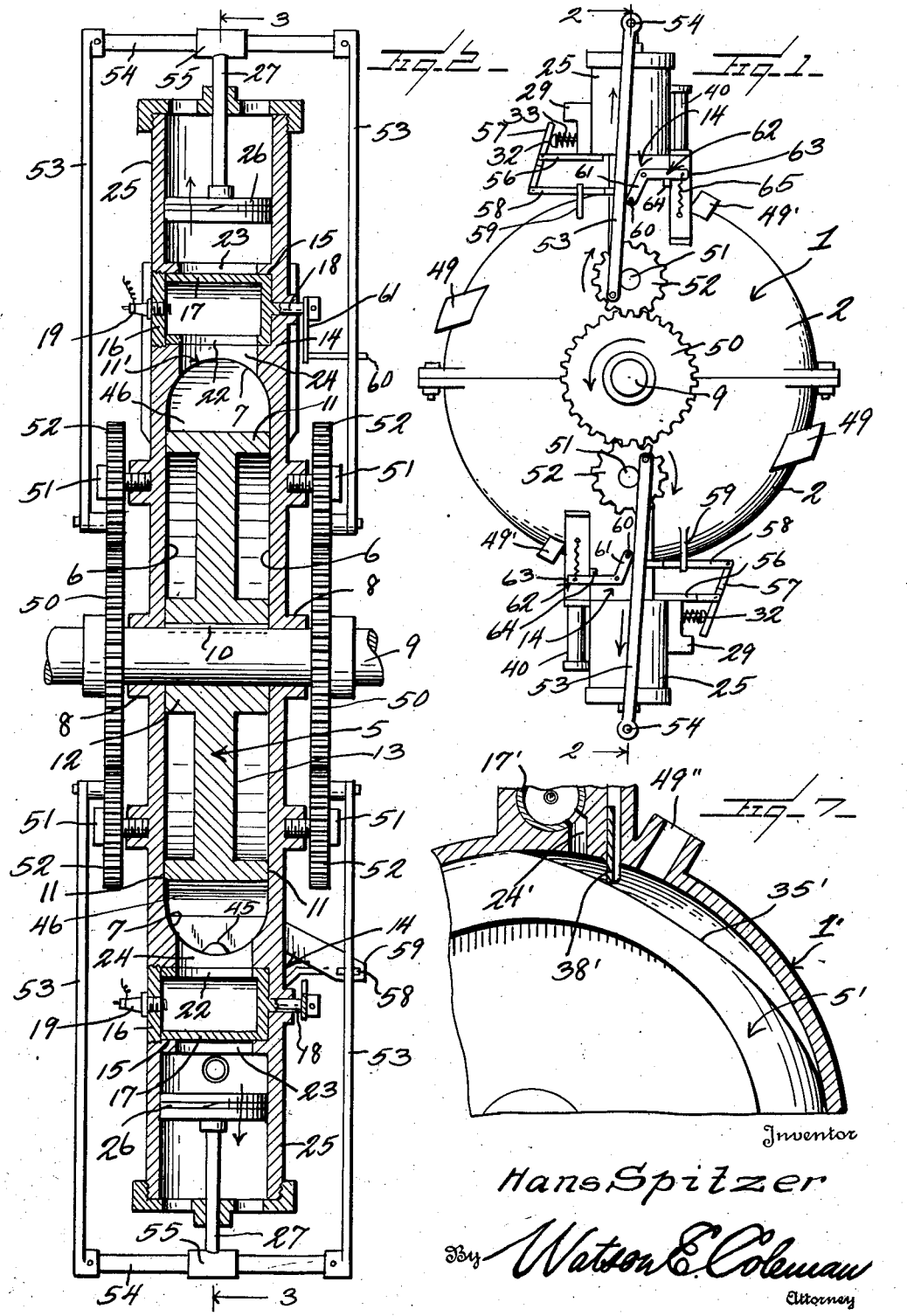
Inventor
Hans Spitzer
By Watson E. Coleman
Attorney

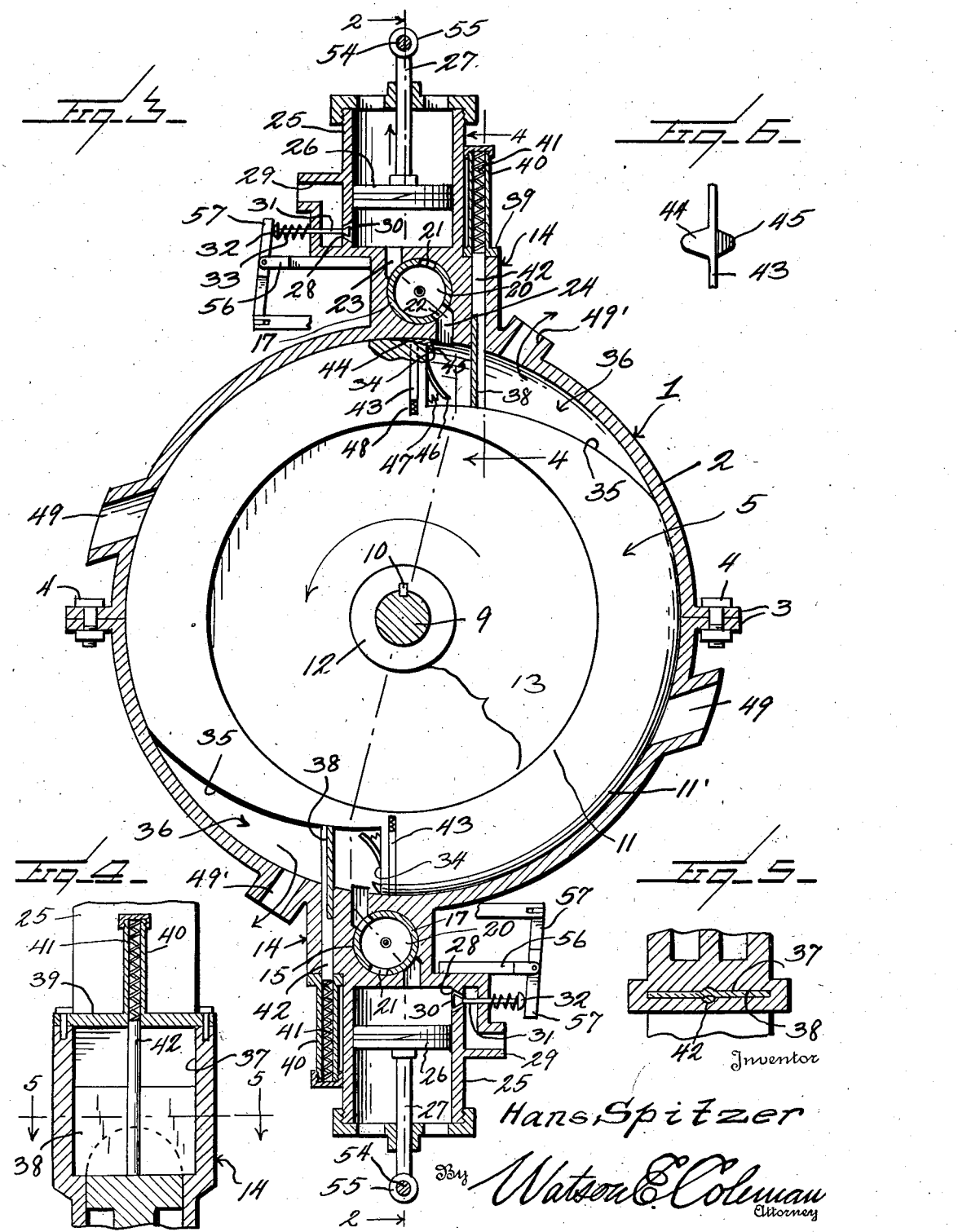

July 25, 1944.                   H. SPITZER                    2,354,486
                                ROTARY ENGINE
                           Filed Jan. 6, 1942              3 Sheets-Sheet 3
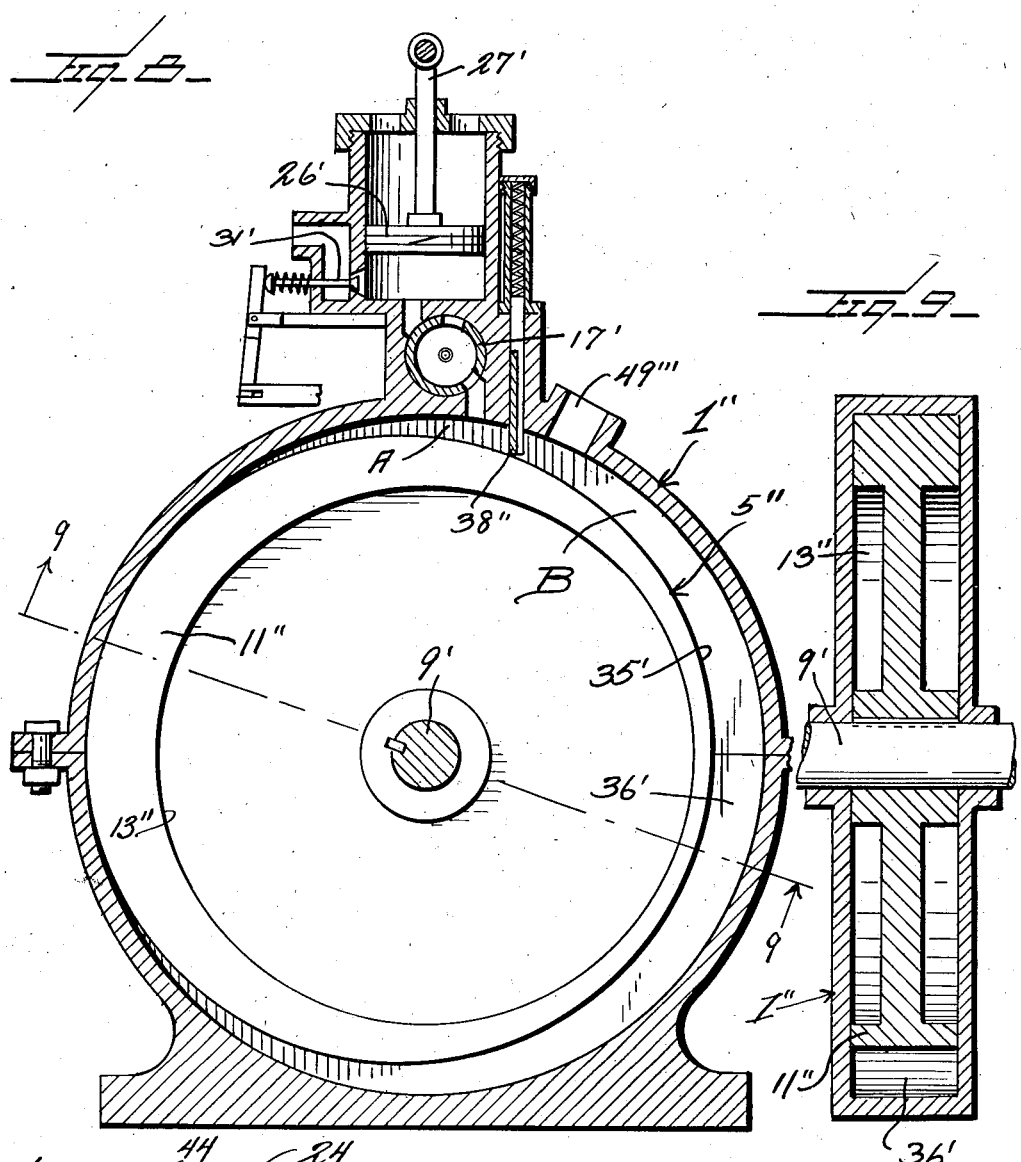
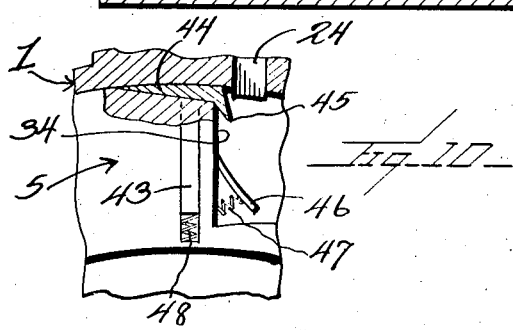
Inventor
Hans Spitzer
By Watson E. Coleman
    Attorney Patented July 25, 1944

2,354,486

UNITED STATES PATENT OFFICE 2,354,486

ROTARY ENGINE

Hans Spitzer, Klein Kwartier, Curacao, Netherland West Indies

Application January 6, 1942, Serial No. 425,788

2 Claims. (Cl. 60—44)

This invention relates to improvements in rotary engines or motors and is directed primarily to an improved form of rotary internal combustion engine although capable of being operated by other means and this application constitutes a continuation in part of my prior application Serial Number 381,181, filed February 28, 1941, now abandoned.

The primary object of the present invention is to provide a rotary engine or motor which is so designed that the expanding propulsive medium when introduced into the expansion chamber, imposes its power directly against the rotating member of the motor in a direction tangential to the periphery of such rotating member, rather than against a reciprocating body through which the power must then be transferred by connecting rods to a rotary element as in the case of ordinary two-cycle and four-cycle engines wherein pistons and connecting rods are employed for effecting the turning of a power shaft.

A further object of the invention is to provide a rotary internal combustion engine employing a novel type of rotor having peripheral recesses between the walls of which and the wall of the enclosing casing and a reciprocable vane, an expansion chamber of novel form is developed, and in which engine structure a novel means is provided for igniting the compressed explosive charge outside of the expansion chamber and subsequently introducing the expanding gases into the expanding chamber.

Still another object of the invention is to provide in a rotary internal combustion engine, a fuel charge compressing means, an explosion chamber connected therewith, and an expansion chamber forming a part of the peripheral portion of a rotor body and adapted to be connected with the explosion chamber, with novel means operated directly from the rotor for performing in proper sequence the steps of taking in and compressing a fuel charge in the compression chamber, then transferring such compressed charge to the explosion chamber in which it is ignited, and then transferring the ignited fuel or explosive charge to the expansion chamber of the rotor to permit such charge to exert its force upon the rotor.

A still further object of the invention is to provide a rotary internal combustion engine having a completely circular rotor mounted for eccentric rotation within a circular chamber in association with a reciprocable vane forming an abutment having an edge in sliding contact with the rotor and forming therewith and with adjacent parts of the chamber an expansible chamber in which products of combustion are discharged for expansion to exert necessary power against the periphery of the eccentric rotor to effect turning of the same.

The invention will be best understood from a consideration of the following detailed description taken in connection with the accompanying drawings forming part of this specification, it being understood, however, that the invention is not to be considered as limited by the specific illustration or description but that such illustration and description constitute a preferred embodiment of the invention.

In the drawings:

Figure 1 is a view in side elevation of an engine constructed in accordance with the present invention.

Figure 2 is a sectional view in the plane of the axis of rotation of the rotor for the engine and substantially on the line 2—2 of Figure 1.

Figure 3 is a sectional view taken substantially on the line 3—3 of Figure 2 in a plane at right angles to the axis of turning for the rotor.

Figure 4 is a sectional view taken on the line 4—4 of Figure 3.

Figure 5 is a transverse section on the line 5—5 of Figure 4.

Figure 6 is a view in top plan of a packing strip which is disposed transversely of the periphery of the rotor of one embodiment of the invention.

Figure 7 is a detailed sectional view illustrating a modification of the rotor structure of the first embodiment of the invention.

Figure 8 is a sectional view corresponding to the section of Figure 3 but showing a modified rotor construction.

Figure 9 is a sectional view on line 9—9 of Figure 8.

Figure 10 is a detailed view on an enlarged scale of the packing ring and wear tongues forming a part of the same.

Referring now more particularly to the drawings reference will first be made to the embodiment of the invention illustrated in Figures 1 to 6, inclusive, wherein the numeral 1 generally designates the rotor housing which is here shown as being of circular form, although this form for the exterior of the housing is not essential so long as the interior thereof is circular, as shown in Figure 3. This housing is divided transversely into two sections 2, which sections are provided with opposing ears 3, which are joined together by the nut and bolt assemblies 4. The interior of the housing, which forms the chamber for a rotor, which is indicated generally by the numeral 5, has the opposed parallel flat side wall faces 6, while the peripheral portion of the chamber is of semi-circular shape, as indicated at 7.

The two portions 2 of the housing are formed to provide, when they are secured together, the hubs 8, which are at the radial center of the housing or of the chamber, and through these hubs there extends the shaft 9 which, of course, passes axially through the rotor chamber.

The rotor 5 is mounted upon the shaft 9 and is keyed thereto, as indicated at 10, in Figures 2 and 3. This rotor is in the form of a circular disc having a rim portion 11 which has flat parallel side faces adapted for smooth contact with the adjacent faces of the walls 6 of the chamber and having a periphery of circular cross-sectional form, as indicated at 11', to conform to and closely fit the semi-circular form of the outer or peripheral part of the rotor chamber, as is most clearly shown in Figure 2.

The center of the rotor 5 has a hub 12 of a length equal to the width of the housing casing and the intermediate portion of the rotor between the hub and the rim 11 is cut away as indicated at 13, upon each of the two side faces of the rotor, as is clearly shown in Figures 2 and 3, for the purpose of lightening the structure.

Integral with the housing 1 at substantially diametrical positions are valve blocks 14 in each of which is formed a rotary valve bore 15 which extends transversely of the housing or parallel with the shaft 9, and which, as shown in Figure 2, opens at one end through a side of the block 14, in which it is formed. Each of these bores 15 is closed at its open end by a head 16 and this head bears against the open end of a rotary cylinder 17, the opposite end of which cylinder has extending therefrom a stem 18, which passes outwardly through a suitable passage in the end wall of the bore to the exterior of the block 14, as shown in Figure 2. A sparking or ignition device 19 is secured in each head 16 and extends into the cylinder 17 for the purpose of igniting a fuel charge therein and the interior of the cylinder 17 forms a chamber which is identified by the numeral 20 in which the compressed fuel charge is exploded.

The rotary cylinder which functions as a valve, as will be hereinafter made apparent, has the side wall thereof provided with inlet and outlet ports 21 and 22, respectively, and there leads from the bore 15 in which the rotary cylinder is fitted, the inlet passage 23 and the transfer passage 24. The transfer passage is tangential to one side of the bore 15 and leads into the rotor chamber, while the inlet passage 23 is tangential to the other side of the bore and leads toward the cylinder 17 from the lower end of the interior of piston cylinder 25, which constitutes a fuel intake and compression cylinder. This cylinder 25 is integrally connected with the valve block 14 and reciprocably disposed therein is a piston 26 which is connected with a piston rod 27 which passes out through the outer end of the cylinder.

At the inner end of each piston cylinder 25 is a fuel admission port 28 which leads from the fuel admission passage 29 which may be connected with any suitable type of carbureting device or any other mechanism for supplying operative or propulsive fluid to the engine.

A poppet type valve 30 is provided for controlling the flow of fuel from the passage 29 into the adjacent piston cylinder 25 and such valve has a stem 31 extending outwardly from the cylinder and provided with a head 32 upon its outer end. Interposed between the head 32 and the adjacent part of the structure in which the valve stem is slidably mounted is an expansion spring 33 which normally functions to move the valve to closed position.

As will be observed upon reference to Figure 3 of the drawings, the inlet and outlet ports of the cylinder valves 17 are not diametrically opposite one another but are located both within a 180° radius of the cylinder as a result of which, when one port is in communication with one of the passages which connects with the bore 15, the other port will be out of communication with the other passage connecting with that bore. In the position in which the ports are shown in Figure 3, the outlet port of each cylinder valve is in communication with the adjacent transfer passage and the inlet port 21 is out of communication with the inlet passage 23, which is adjacent thereto, but when the cylinder valve is rotated in the proper direction to bring the inlet port 21 into communication with the adjacent passage 23, the outlet port 22 will be removed from connection with the adjacent transfer passage 24.

The rotor 5 has the circular or semi-circular peripheral portion thereof provided with cut-out sections or notches, each of which has a straight substantially radial end wall 34 and an inner or bottom wall 35, which is slightly longitudinally convexed and extends from the wall 34 to the periphery of the rotor. There are thus provided the two chambers 36 which are of gradually decreasing depth from the wall 34 to the remote end of the bottom 35, such chambers being completed by the coaction of the notches in the periphery of the rotor with the covering circular wall 7 of the housing chamber.

In each valve block 14 there is formed a narrow guide slot 37 in which is slidably mounted an abutment vane 38. These abutment vane guide slots 37 open into the housing chamber through the curved peripheral wall 7, so that the vanes which extend transversely of the periphery of the rotor may enter the chambers 36 as the walls 34 move around past the vanes so that such walls 34 and the adjacent vanes, when the latter have entered the chamber 36 and are in sliding contact with the bottom 35 of the notch which is formed in the rotor, will coact to set up an expansible chamber into which a propellent charge enters from the adjacent transfer passage 24.

The vanes 38 are gradually forced outwardly as the bottom or floor 35 slides around under the vane, until each of the vanes has been forced outwardly to the limit of its movement and is riding upon the periphery of the rotor.

Each channel 37 is closed at its outer end by a head 39 with which is formed a spring enclosing tube 40, which houses the compression spring 41. Each vane carries a stem 42 which maintains engagement at its outer end in the tube 40 and is engaged by one end of the spring 41, and thus it will be seen that as the vane is forced outwardly, the spring 41 will be compressed. This spring effects the inward movement of the vane as the wall 34 of a cylinder passes the inner edge of a vane.

Disposed across the periphery of the rotor to the full extent of the curved portion thereof and in close proximity to each cylinder wall 34, is a packing strip 43 which is countersunk in the curved surface 11 of the rotor. This strip 43 has formed integrally therewith upon one side a tongue 44 which is countersunk in the peripheral surface of the rotor and a lip 45 which extends over the edge of the adjacent wall 34. This lip 45 causes the edge of the vane to pass over the edge of the wall 34 with a minimum of wear.

Extending across the angle between the wall 34 and the bottom or floor 35 of each of the notches forming a part of a cylinder is a shock absorbing spring strip 46 which is fixed at one end in the face of the wall 34 and has its other end swinging free across the angle described and behind this strip 46 is a spring 47 which normally urges the strip outwardly away from the wall 34. This strip acts as a shock absorber for the vane when the latter is projected inwardly by the spring 41 and prevents development of noise in the operation of this element of the engine.

The ends of the packing strip 43 also have small expansion springs interposed between them and the ends of the groove in which they are housed, as indicated at 48, for the purpose of urging the packing strip into firm contact with the curved wall surface 7 of the rotor chamber.

As is shown in Figure 3, the extent of the tapering chambers 36 is less than 90° around the periphery of the rotor and there is provided in the housing, for communication with the interior of the chamber in which the rotor is located, an exhaust port 49 which is removed from each of the transfer passages 24 in the direction of rotation of the rotor, approximately 90°, so that immediately after the tapered off end of the cylinder has passed a transfer passage, the deeper end of the cylinder, being the end in which the wall 34 is located, will enter into communication with an exhaust passage so that the products of combustion may escape from the cylinder to the atmosphere.

In addition to the exhaust ports 49 there is provided immediately at the back of each vein 38 a port 49′ which opens through the wall of the housing and which functions as an auxiliary exhaust and means of preventing the establishment of back pressure in the constantly reducing or shrinking size of the cylinder behind the vane after the latter has dropped into substantially parallel relation with the wall 34. If desired this port 49′ adjacent each vane may be made of sufficient size to handle all of the exhaust gases so that the port 49 may be done away with.

The shaft 9 carries upon each side of the engine a gear 50 and at diametrically opposite sides of each of these gears there are supported upon studs 51, the pinions 52 which are of approximately half the diameter of the gear 50, with which they mesh. Each pair of pinions 52 between which the engine is disposed, is located upon the same axis of rotation and each of the pinions of each pair has eccentrically connected therewith a connecting link 53 which is pivotally attached at its outer end with a cross-head 54, which in turn has rocking connection through the medium of the sleeve 55 with the outer end of the adjacent compression piston connecting rod 27. Since the pairs of pinions 32 are of half the diameter of the driving gears 50 with which they are connected, it will be apparent that for each complete rotation of the rotor 5, these pinions will make two revolutions so as to cause each piston to move through two complete cycles. In this way, each of the pistons 26 will function to serve each expansion chamber 36 upon one revolution of the rotor.

The opening of the fuel admission valves 30 in proper sequence with the movement of the other parts of the engine is effected as follows. Pivotally supported upon an arm 56 adjacent each valve stem 31 or in any other suitable manner, is a rocking arm 57, one end of which engages the head 32 of the adjacent poppet valve stem. The other end of the rocker arm 57 is operatively coupled with a slide 58 which is supported in a suitable manner, as, for example, upon a guide 59, Figure 1, for reciprocal movement in a path transverse to the adjacent link 53. This slide 58 is arranged to be engaged as the end remote from the rocker 57 by the adjacent link 53, so that as this link swings back and forth in making its reciprocating movement, it will, when moving to one side of the rotary center or the gear 52 with which it is connected, force the slide 58 over so as to rock the rocker arm 57 in a manner to open the fuel admission valve 30 against the tension of the spring 33. However, when the link has swung to the opposite side of the rotary center of the gear 52 with which it is pivotally connected, the spring 33 of the fuel admission valve will force the valve to closed position and the valve will remain closed through half a revolution of the gear and also through half of the swinging cycle of the link.

When the link 53 which operates the adjacent slide 58 for the opening of the poppet valve during the movement of one-half of its swinging cycle, is moving through the other or second half of its swinging cycle, at which time the poppet valve is closed, it will function to oscillate the cylinder valve by engaging the laterally extending finger 60 carried upon the arm 61 of a bell crank lever 62, which bell crank lever is secured at the angle between the arm 61 and its other arm 63 to the stem 18 of the adjacent cylinder valve. The second arm 63 of the cylinder valve bell crank is normally drawn into position against a stop 64 by a contractile spring 65, and when the arm is in this position, the cylinder valve will be in the position in which it is shown in Figure 3. In other words, when the bell crank 62 connected with a cylinder valve is under the control of the spring 65, the cylinder valve will have its outlet port in communication with the transfer passage 24, and the link adjacent to the slide 58 will be in engagement with this slide to hold the adjacent fuel inlet poppet valve through the first half of the swinging cycle of the link. It will be understood, of course, upon reference to Figure 1, that at this time the fuel intake and compression piston 26 will be moving outwardly to draw a fuel charge into the cylinder. When the operating link which is connected with the fuel intake and compression piston has reached the limit of its outward movement and is starting to make the second half of its swinging cycle, at which time the piston 26 will be moving inwardly, it will engage the finger 60 to rock the bell crank 62 and rotate the cylinder valve to a position where the inlet port 21 will be in communication with the inlet passage 23 and the outlet port 22 will be out of communication with the transfer port 24, and since the fuel admission poppet valve will be closed, the fuel charge will be gradually compressed and forced into the explosion chamber 20 of the cylinder valve.

It will be understood that as the pinion actuated link starts to shift the slide 58 to open the poppet valve, it will release the bell crank to allow the spring 65 to take control so as to turn the cylinder valve back to the position in which it is shown in Figure 3, and at this time the wall 34 of an expansion cylinder will have just passed the abutment vane 38 and the transfer passage 24, so that the compressed fuel which has just been ignited, will pass through the transfer passage 24 into the space between the wall 34 and the abutment valve to effect the turning of the rotor.

In Figure 7 there is illustrated a slightly modified form of the expansible chamber or cylinder forming means. In this figure the rotor is indicated by the numeral 5' while the housing is indicated by the numeral 1'. The abutment valve or vane is indicated at 38' and adjacent this vane is the fuel transfer port or passage 24' by which the fuel is carried from the rotary cylinder valve 17', the interior of which valve forms the chamber in which the ignition of the fuel is effected.

The expansion chamber is formed in this modified construction by cutting away a portion of the periphery of the rotor along the curved line which extends generally around the axis of rotation for the rotor. There is thus formed the arcuate bottom or floor 35' for the expansion chamber and on which the inner edge of the vane 38' bears as it is urged inwardly by the control spring, not shown. An exhaust port for the products of combustion is formed through the wall of the housing immediately at the rear of the vane 38' or, upon the opposite side of the vane from the port 24', this port being indicated by the reference character 49".

Figures 8 and 9 illustrate still another embodiment of the present invention wherein the same charge forming and admitting mechanism is made use of but the rotor is of completely circular form and is eccentrically mounted within the housing in the manner hereinafter described.

The charge forming and admitting mechanism is the same as that shown in the first described embodiment of the invention, therefore, no specific description will be given of the same. Also the operation of the valves and the pistons for the charge forming mechanism may be effected in suitable manner, preferably from the shaft 9' by means of a suitable gearing, not shown, operatively coupled with the piston rod 27' and actuating the reciprocable valve 31' and the rotary valve 17' in the manner previously described in connection with the form of the invention shown in Figures 1 to 3.

The rotor housing in the embodiment of the invention shown in Figures 8 and 9, is indicated generally by the reference character 1" and the shaft 9' supports therein the eccentric rotor which is indicated generally by the numeral 3". This rotor is provided with a flat peripheral face 35' and has its parallel side faces cut away, as indicated at 13", so as to reduce the central thickness thereof and also to produce or form a rim portion 11" which has an overall thickness equal to the interior width of the housing so that the side faces of the rim bear tightly against and have smooth contact with the opposing walls of the interior of the housing.

The eccentricity of the rotor is such that its peripheral surface 35' is in relatively tight contact throughout a short portion of its extent through that part which is farthest removed from the center of the shaft 9' and the formation of the rim 11" is such that the rim has a greater thickness through the portion nearest the area of contact between the rotor and the peripheral wall of the housing chamber in which it is located than at the diametrically opposite part. Consequently when turning the rotor will tend to throw its weight toward the area of contact with the chamber wall.

There is formed between the major portion of the peripheral surface 35' of the rotor and the inner circular surface of the casing outer wall, an arcuate chamber 36' which is divided into two portions through the major period of rotation of the rotor, by the vane 38". The only time when the vane does not extend into the housing to divide the chamber 36' as stated is when the high point of the rotor is passing the vane, at which time the rotor will maintain the vane in its farthest outward position but as soon as this high point is passed the vane will be urged inwardly and will divide the chamber 36' into an explosive gas receiving portion which is here indicated by the reference character A and a portion which will be discharging products of combustion through the exhaust port 49'" and which second mention portion is indicated by the reference character B. It will, of course, be understood that the mechanism for timing the movement of the piston 26' and the movements of valves 17' and 31' will have to be regulated so as to furnish a charge of ignited fuel to the area or chamber portion A at the proper moment with each revolution of the rotor.

While in the description of the different embodiments of the present invention reference has been made to the use of explosive charges for impelling turning of the rotor, it is to be understood that the invention is not to be limited in operation by ignited or exploded gases as it will be readily apparent that it may be effectively operated by the introduction of air under pressure into the expansible chambers or by the use of any other fluid under pressure.

It is also to be understood that while in the first described embodiment there has been shown a structure employing two expansible chambers and corresponding fuel compression and fuel explosion chambers, while in another embodiment a single expansible chamber is shown, it is to be understood that the invention is not to be limited to the use of one or two expansible chambers but that the same may be constructed with a multiplicity of such chambers where found desirable.

What is claimed is:

1. A rotary engine comprising a housing having a circular compartment, a circular rotor supported for turning in said compartment, the rotor having a portion of its periphery cut out to form a straight radially directed wall and a floor extending from the bottom of the straight wall to and merging with the peripheral surface of the rotor, the remaining portion of the rotor peripheral surface contacting the peripheral wall of the compartment, said cut out portion forming a chamber with the wall of the compartment, a spring projected abutment valve movably supported by the housing and constantly urged to move into the chamber toward the rotor periphery for contact with said floor to divide the chamber into a power portion, bordered by said straight wall and the abutment valve, and an exhaust portion, an exhaust for the second named portion, means for introducing an expansible fluid into the power portion of the chamber between the abutment valve and said wall, means adjacent to the angle formed between said straight wall and said floor forming a yieldable check for the abutment valve in its movement inwardly toward the floor, said rotor having a substantially semi-circular periphery, said periphery having a packing strip channel formed transversely thereof adjacent to said straight wall, a packing strip disposed in said channel, said strip being substantially semi-circular, and a pair of oppositely directed tongues integral with said strip at substantially midway between its ends, one of said tongues being embedded in the peripheral surface of the rotor and the other tongue extending across the adjacent edge of the straight wall to be contacted by the abutment valve as the valve and straight wall come into position where the valve is freed to move inwardly toward the floor.

2. A rotary engine comprising a housing having a circular compartment, a circular rotor supported for turning in said compartment, the rotor having a portion of its periphery cut out to form a straight radially directed wall and a floor extending from the bottom of the straight wall to and merging with the peripheral surface of the rotor, the remaining portion of the rotor peripheral surface contacting the peripheral wall of the compartment, said cut out portion forming a chamber with the wall of the compartment, a spring projected abutment valve movably supported by the housing and constantly urged to move into the chamber toward the rotor periphery for contact with said floor to divide the chamber into a power portion, bordered by said straight wall and the abutment valve, and an exhaust portion, an exhaust for the second named portion, means for introducing an expansible fluid into the power portion of the chamber between the abutment valve and said wall, the said rotor having a substantially semi-circular periphery, said periphery having a packing strip channel formed transversely thereof adjacent to said straight wall, a packing strip disposed in said channel, said strip being substantially semi-circular, and a pair of oppositely directed tongues integral with said strip at substantially midway between its ends, one of said tongues being imbedded in the peripheral surface of the rotor and the other tongue extending across the adjacent edge of the straight wall to be contacted by the abutment valve as the valve and straight wall come into position where the valve is freed to move inwardly toward the floor.

HANS SPITZER.